3,069,429
NEW HERBICIDAL COMPOUNDS
David H. Godson, Edward L. Leafe, Gerald B. Lush, and Herbert A. Stevenson, Nottingham, England, assignors to Boots Pure Drug Company Limited, Nottingham, England, a company of Great Britain
No Drawing. Filed Oct. 19, 1959, Ser. No. 847,098
Claims priority, application Great Britain Oct. 29, 1958
8 Claims. (Cl. 260—304)

This invention relates to new herbicidal compounds and compositions thereof. In particular it relates to new benzothiazole derivatives which have been found to possess valuable herbicidal properties.

The control of weeds by chemical means is now common agricultural and horticultural practice, but although a large amount of work has been carried out on the theoretical aspects of chemical weed control, the weedkillers at present available are all deficient in one respect or another. This applies particularly to the "selective" weedkillers, viz. the weedkillers that may be applied to crops and weeds in order to control the weeds without affecting the crops. The spectrum of weed control obtainable by the use of the available selective weedkillers is not entirely adequate. In addition the effectiveness of the available selective weedkillers against certain weeds is not sufficient. Accordingly there is a constant demand for improved weedkillers.

It is an object of the present invention to provide new benzothiazole derivatives, the properties of which make them potentially valuable as weedkillers. Another object of the invention is the provision of new herbicidal compositions containing as active ingredients the new benzothiazole compounds.

According to one feature of the present invention there are provided 4-halogeno-2-oxobenzothiazolin-3-ylacetic acids and their derivatives as hereinafter defined.

By the term derivatives, we means salts, esters, amides and nitriles of the 4-halogeno-2-oxobenzothiazolin-3-yl-acetic acids.

Salts of 4-halogeno-2-oxobenzothiazolin-3-ylacetic acids which form part of the present invention include salts formed from inorganic and organic bases, such as for example, metal, e.g. sodium and potassium, ammonium and organic amine salts.

Esters of 4-halogeno-2-oxobenzothiazolin-3-ylacetic acids which form part of the present invention include esters formed from simple alcohols such as methanol, ethanal, propanol, butanol etc., long chain alcohols such as hexyl, heptyl, octyl, 3:5:5-trimethylhexyl alcohol etc., aralkanols such as benzyl alcohol, glycol monoethers such as 2-butoxyethyl and 2-2'-butoxyethoxyethyl alcohol, and hydroxy acid derivatives such as ethyl lactate.

The compounds of the invention have been found to possess herbicidal properties of a very high order. Of particular interest is the fact that the compounds show very substantial herbicidal activity against the important weeds redshank (*Polygonum persicaria*), cleavers (*Galium aparine*) and chickweed (*Stellaria media*). This finding is a valuable contribution to the art of chemical weed control, as no well-established selective weedkiller of the plant growth regulating type effectively controls all these weeds. Thus 2:4-dichlorophenoxyacetic acid (2:4 - D) and 4 - chloro - 2 - methylphenoxyacetic acid (M.C.P.A.), the most widely used hormone weedkillers, do not control cleavers at all and have low activity against chickweed and redshank. Alpha-(4-chloro-2-methylphenoxy)propionic acid (C.M.P.P.), which has recently been introduced as a selective weedkiller, is very effective against cleavers and chickweed, but does not control redshank adequately. The compounds of the invention are not phytotoxic to cereals when applied at the rates necessary to control the aforementioned weeds and when applied at the stage of cereal growth at which the well-known selective herbicides are normally used.

According to another feature of the invention there is provided a process for the preparation of a 4-halogeno-2-oxobenzothiazolin-3-ylacetic acid or its derivatives as hereinbefore defined of the general formula

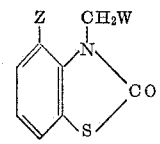

wherein Z represents a halogen atom and W represents a carboxyl group or a salt or ester thereof, an amide group of a cyano group, which comprises reacting a 4-halogeno-2-oxobenzothiazoline with a compound selected from X—CH$_2$—Y and R'OCH$_2$R'' wherein X represents a halogen atom, R' represents an alkanesulphonyl or arenesulphonyl group, R'' represents a cyano group and Y represents a carboxyl group or a salt or ester thereof, an amide group or a cyano group, in the presence of an alkaline condensing agent, and when the group Y or R'' does not correspond the desired group W, converting Y or R'' to W by known methods.

According to a further feature of this invention there is provided a process for the preparation of a 4-halogeno-2-oxobenzothiazolin-3-ylacetic acid or a derivative thereof as hereinbefore defined which comprises halogenating 2-oxobenzothiazolin-3-ylacetic acid or a derivative thereof.

As is to be expected the halogenation of a 2-oxobenzothiazolin-3-ylacetic acid or a derivative thereof leads to a mixture of halogeno-2-oxobenzothiazolin-3-ylacetic acids or derivatives thereof, such a mixture containing a proportion of the 4-halogeno isomer. In addition to the required 4-halogeno isomers, the 6-halogeno isomers are also produced. However, although possessing much less herbicidal activity, the 6-halogeno isomers are not harmful and the crude mixture containing a proportion of the required 4-halogeno isomer may be used in the compositions of the invention described hereinafter.

According to another feature of this invention there are provided herbicidal compositions which comprise a compound of the invention in association with a diluent or carrier.

The term "herbicidal compositions" is intended to mean not only compositions in a suitable form for application to plants but also highly concentrated compositions which may be supplied to the user and which require dilution with a suitable quantity of water or other diluent before application to plants.

The nature of the diluents or carriers to be used in the compositions of the invention will depend on the physical properties of the active ingredients. Typical compositions falling within this feature of the invention include the following:

(a) *Dispersible solutions.*—A dispersible solution comprises a solid, water-insoluble compound of the invention dissolved in a water-miscible solvent, for example acetone, with the addition of a dispersing agent, such that an aqueous dispersion is formed on dilution with water.

(b) *Miscible oils.*—A miscible oil comprises a water-insoluble compound of the invention which may be a solid or a liquid dissolved in a water-immiscible solvent, for example a high boiling hydrocarbon, with the addition of an emulsifying agent such that an emulsion is formed on dilution with water. In the case of liquid, water-insoluble compounds of the invention, the solvent may be omitted if desired. Alternatively the user may be supplied with a concentrated emulsion obtained from a miscible oil by the addition of approximately an equal volume of water. Such concentrated emulsions are diluted with an appropriate amount of water before application to plants.

(c) *Dispersible powders.*—A dispersible powder comprises a water-insoluble compound of the invention in association with a solid inert diluent, for example kaolin, and a dispersing agent.

(d) *Dusts.*—A herbicidal dust comprises a compound of the invention in association with a solid, pulverulent diluent which may be an inert diluent such as kaolin or a standard agricultural fertiliser.

(e) *Aqueous solutions.*—Water-soluble compounds of the invention may be formulated as aqueous solutions.

The dispersible solutions, miscible oils, dispersible powders, and aqueous solutions hereinbefore described may also contain a wetting agent if desired.

The 4 - halogeno - 2-oxobenzothiazolin-3-ylacetic acids are solid, water-insoluble compounds and may therefore be formulated as (a) dispersible solutions, (b) miscible oils, (c) dispersible powders and (d) dusts. The esters of 4 - halogeno - 2-oxobenzothiazolin-3-ylacetic acids are also water-insoluble, and, depending on the alcohol moiety may be solid or liquid. Accordingly they may be formulated in the same manner as the free acids, except that dispersible solutions are not practicable in the case of the liquid esters. The nitriles and amides of 4-halogeno-2-oxobenzothiazolin-3-ylacetic acids are also water insoluble, solid compounds and may be formulated in the same manner as the acids. In the case of salts of 4-halogeno - 2 - oxobenzothiazolin-3-ylacetic acids, the soluble salts, such as those formed from alkali metal bases and simple alkyl- and hydroxyalkyl amines, may be formulated as (e) aqueous solutions. It may be convenient to supply to the user a salt in solid form, with or without the addition of a wetting agent, to be added to an appropriate volume of water to produce a solution for application to the plants.

The concentration of active ingredient in the diluted compositions of the invention which are applied to crops for the control of weeds is dependent on the particular crop and weed which it is desired to treat, and also on the type of machine which is to be used in applying the compositions, as both "low volume" and "high volume" sprayers are commonly used, requiring compositions containing different concentrations of active ingredient. From the point of view of weed control the important consideration is the total quantity of active ingredient applied per unit area of the crop to be treated. For the control of redshank, cleavers and chickweed we have found that application of 4-chloro-2-oxobenzothiazolin-3-ylacetic acid or its salts or esters at a rate of ¼–1 lb. acid equivalent per acre is suitable. The lower rate of ¼–½ lb. acid equivalent per acre is sufficient to control cleavers and chickweed, but redshank appears more resistant, and a rate of at least ½ lb. acid equivalent per acre is preferable to ensure adequate control of this weed. Accordingly a convenient rate of application to ensure adequate control of all three weeds would be about ½ lb. acid equivalent per acre.

As stated hereinbefore in this specification, the compounds of the invention do not produce phytotoxic symptoms in cereals when applied at the correct stage of growth of the cereals. Thus in the case of 4-chloro-2-oxobenzothiazolin - 3-ylacetic acid and its derivatives, spring cereals may be sprayed in their early stage of growth (i.e. 1–5 leaves) with ¼ lb. acid equivalent per acre of control cleavers and chickweed without damaging the cereal plants. At higher rates to control redshank, cleavers and chickweed, it is preferable to delay spraying until the 5 leaf stage to ensure complete avoidance of cereal damage. As in the case of the well-known hormone selective weedkillers, spraying must not be carried out after the "shooting" stage of the cereals.

The compositions of the invention may contain other herbicides such as 2:4–D., M.C.P.A. and C.M.P.P. in addition to the other ingredients hereinbefore described.

A valuable combination comprises 4-halogeno-2-oxobenzothiazolin-3-ylacetic acid or its derivatives as hereinbefore defined in association with M.C.P.A. or suitable derivative thereof. Such compositions possess herbicidal activity against a wide spectrum of weeds. A significant feature of these mixtures is that there are indications that they will control mayweed (*Matricaria inodora*), a weed not controlled by either 4-halogeno-2-oxobenzothiazolin-3-ylacetic acids or M.C.P.A. or its derivatives alone. Compositions which contain a 4-halogeno-2-oxobenzothiazolin-3-ylacetic acid and M.C.P.A. or suitable derivatives of these acids in a raio of 4-halogeno-2-oxobenzothiazolin-3-ylacetic acid:M.C.P.A. of between 1:1 and 1:4 are particularly suitable for providing wide spectrum herbicidal activity.

A composition comprising 4 - halogeno-2-oxobenzothiazolin-3-ylacetic acid or a derivative thereof as hereinbefore defined in association with C.M.P.P. or a suitable derivative thereof is also very valuable. Compositions which contain a 4 - halogeno - 2 - oxobenzothiazolin-3-ylacetic acid and C.M.P.P. or suitable derivatives of these acids in a ratio of 4-halogeno-2-oxobenzothiazolin-3-ylacetic acid:C.M.P.P. of between 1:2 and 1:8 are particularly suitable for providing wide spectrum herbicidal activity.

The very high herbicidal activity against cleavers, chickweed and redshank exhibited by the compounds of the invention is very surprising, as such activity is not shared by closely related 2-oxobenzothiazolin-3-ylacetic acids, as will be seen from the data presented below.

A test devised to determine the herbicidal effectiveness of compounds against cleavers, chickweed and redshank was carried out as follows:

Quadruplicate batches of cleavers, chickweed and redshank were sprayed with aqueous emulsions of esters of various 2-oxobenzothiazolin-3-ylacetic acids or with aqueous solutions of the diethanolamine salts of these acids. A graded series of rates equivalent to ¼, ½ and 1 lb. of free acid per acre were applied in a volume of water corresponding to 20 gallons per acre. The plants were grown in pots under standardised conditions and were assessed one month after treatment by a visual examination, the response elicited being graded according to the following scale.

0—No visible response.
1—Doubtful response.
2—Definite response but one which leads to no permanent loss of size, vigour or pigmentation nor induces significant morphological change, e.g. transitory epinasty.
3—Intermediate response.
4—A marked plant growth regulator response which leads to a loss of size, vigour or pigmentation or causes a significant permanent change in the plant's morphology, but which does not lead to its death.
5—Intermediate response.
6—Severe plant growth regulator response which, by the end of the examination period of one month results in the plant's death.

The results obtained with 4-halogeno-2-oxobenzothiazolin-3-ylacetic acids, and the corresponding unsubstituted, 5-chloro, 6-chloro and 4:6-dichloro compounds are shown in Table I.

TABLE I

| Compound | Cleavers, lbs. a.e./acre | | | Chickweed, lbs./a.e./acre | | | Redshank, lbs./a.e./acre | | |
|---|---|---|---|---|---|---|---|---|---|
|  | 0.25 | 0.5 | 1.0 | 0.25 | 0.5 | 1.0 | 0.25 | 0.5 | 1.0 |
| 2-oxobenzothiazolin-3-ylacetic acid | 2 | 3 | 4 | 0 | 0 | 0 | 0 | 2 | 5 |
| Ethyl ester of 2-oxobenzothiazolin-3-ylacetic acid | 0 | 0 | 0 | 0 | 0 | 0 | 0 | 0 | 0 |
| 5-chloro-2-oxobenzothiazolin-3-ylacetic acid | 1 | 3 | 3 | 1 | 2 | 2 | 0 | 3 | 4 |
| Ethyl ester of 5-chloro-2-oxobenzothiazolin-3-ylacetic acid | 0 | 0 | 2 | 1 | 2 | 2 | 0 | 0 | 2 |
| 6-chloro-2-oxobenzothiazolin-3-ylacetic acid | 0 | 3 | 4 | 0 | 0 | 0 | 0 | 2 | 3 |
| Ethyl ester of 6-chloro-2-oxobenzothiazolin-3-ylacetic acid | 0 | 0 | 1 | 0 | 0 | 0 | 0 | 0 | 2 |
| 4:6-dichloro-2-oxobenzothiazolin-3-ylacetic acid | 0 | 0 | 3 | 1 | 2 | 2 | 0 | 0 | 3 |
| Ethyl ester of 4:6-dichloro-2-oxobenzothiazolin-3-ylacetic acid | 2 | 2 | 3 | 2 | 3 | 3 | 0 | 0 | 0 |
| 4-chloro-2-oxobenzothiazolin-3-ylacetic acid | 4 | 5 | 6 | 5 | 6 | 6 | 4 | 5 | 6 |
| Ethyl ester of 4-chloro-2-oxobenzothiazolin-3-ylacetic acid | 5 | 6 | 6 | 6 | 6 | 6 | 2 | 4 | 4 |
| Ethyl ester of 4-bromo-2-oxobenzothiazolin-3-ylacetic acid | 2 | 3 | 4 | 3 | 4 | 5 | 1 | 2 | 3 |

The following non-limitative examples illustrate the invention.

Example 1

In the preparation of ethyl 4-chloro-2-oxobenzothiazolin-3-ylacetate, a mixture of 186 grams of 4-chloro-2-oxobenzothiazolin, 180 grams of ethyl bromoacetate, 140 grams of potassium carbonate and 1 litre of acetone was heated under reflux for 1.5 hours. The reaction mixture was filtered and the acetone removed from the filtrate by evaporation. This gave an oil which crystallised on treatment with 300 cc. of ethanol. The solid was isolated and recrystallised from ethanol. There was thus obtained ethyl 4-chloro-2-oxobenzothiazolin-3-ylacetate in the form of a crystalline solid, M.P. 78–79° C. Found: C, 48.4; H, 3.8; N, 5.2. $C_{11}H_{10}ClNO_3S$ requires C, 48.6; H, 3.7; N, 5.2%.)

Example 2

A mixture of 12 grams of 4-chloro-2-oxobenzothiazole, 31 grams of ethyl chloroacetate, 15 grams of potassium carbonate and 200 cc. of methyl ethyl ketone was heated under reflux for 60 hours. After filtration the solvent was removed by distillation under reduced pressure leaving an oil, to which was added 50 cc. of ethanol. Chilling of this mixture produced a crystalline solid, M.P. 78–79° C, identical to that obtained in Example 1.

Example 3

Sodium hydroxide (200 cc. of 1.075 N) was added dropwise with stirring to a mixture, heated under reflux, of 54.3 grams of ethyl 4-chloro-2-oxobenzothiazolin-3-ylacetate and 200 cc. of methanol. Methanol (180 cc.) was removed by distillation during 30 minutes and the reaction mixture was poured into 1 litre of water. A slight precipitate was collected and the filtrate was acidified to Congo red. A crystalline precipitate was obtained by chilling. Recrystallisation from ethyl acetate gave 4-chloro-2-oxobenzothiazolin-3-ylacetic acid in the form of a crystalline solid, M.P. 193° C. (Found: C, 44.5; H, 2.4; N, 6.0. $C_9H_6ClNO_3S$ requires C, 44.4; H, 2.5; N, 5.7%.)

Example 4

4-chloro-2-oxobenzothiazolin-3-ylacetic acid (5.0 grams) was heated under reflux with 15 cc. of thionyl chloride. Excess of thionyl chloride was removed by distillation under reduced pressure. The crude acid chloride was distilled at 1–2 mm. (B.P. 110–130° C.) to give an oil which crystallised on standing. This 4-chloro-2-oxobenzothiazolin-3-ylacetyl chloride was heated under reflux with methanol. On cooling crystals were obtained. These were collected and recrystallised from methanol to give methyl 4-chloro-2-oxobenzothiazolin-3-ylacetate, M.P. 126–127° C. (Found: C, 46.3; H, 3.2.

$$C_{10}H_8ClNO_3S$$

requires C, 46.7; H, 3.2%.)

Example 5

A mixture of 10 grams of 4-chloro-2-oxobenzothiazolin-3-ylacetyl chloride, 5 grams of 2-2′-butoxyethoxyethanol, 5 grams of pyridine and 200 cc. of ether was heated under reflux for 2 hours. The reaction mixture was washed with ice-cold 5 N sulphuric acid, water, aqueous sodium bicarbonate and water in succession, and the ether was then removed by distillation. The gummy residue was distilled to give 2-2′-butoxyethoxyethyl 4-chloro-2-oxobenzothiazolin-3-ylacetate in the form of an oil, B.P. 190°/0.075 mm. (Found: C, 52.0; H, 5.6. $C_{17}H_{23}ClNO_5S$ requires C, 52.6; H, 5.7%.)

Example 6

4-bromo-2-oxobenzothiazoline (2.1 grams), ethyl bromoacetate (2 cc.), potassium carbonate (2 grams) and acetone (80 cc.) were heated under reflux for 1.5 hours. After filtration the acetone was removed by distillation and 30 cc. of ethanol was added to the residue. A crystalline precipitate slowly formed and was isolated and recrystallised from ethanol to give ethyl 4-bromo-2-oxobenzothiazolin-3-ylacetate, M.P. 89.5–90° C. (Found: C, 41.6; H, 3.2. $C_{11}H_{10}BrNO_3S$ requires C, 41.8; H, 3.2%.)

Example 7

A mixture of 1 gram of ethyl 4-bromo-2-oxobenzothiazolin-3-ylacetate and 25 cc. of 10 N hydrochloric acid was heated under reflux for 2 hours. At the end of this time the reaction mixture was extracted with ether, and the ether extract was extracted with aqueous sodium bicarbonate. Acidification of the sodium bicarbonate extract produced a precipitate, which was collected and recrystallised from ethyl acetate. There was thus obtained 4-bromo-2-oxobenzothiazolin-3-ylacetic acid, M.P. 190.5–191° C. (Found: C, 37.4; H, 2.0. $C_9H_6BrNO_3S$ requires C, 37.5; H, 2.1%.)

Example 8

4-chloro-2-oxobenzothiazoline (18.5 grams) in 100 cc. of isobutanol and 30 cc. of toluene was heated with sodium hydroxide (4.5 grams) and the water removed by azeotropic distillation. A slurry of the sodium derivative was then obtained. Sodium chloroacetate (12.8 grams) was added to the cooled slurry and the mixture was heated at 105° C. for 3 hours. Water (300 cc.) was added and the isobutanol extracted into ether. The aqueous phase was acidified and then made alkaline with sodium bicarbonate. The insoluble 4-chloro-2-oxobenzothiazoline was removed by filtration and acidification of the filtrate gave a pale yellow gum which rapidly solidified. Two recrystallisations from ethyl acetate gave 4-chloro-2-oxobenzothiazolin 3-ylacetic acid, identical to that obtained in Example 3.

Example 9

A mixture of 4-chloro-2-oxobenzothiazoline (6.0 grams), chloroacetonitrile (3 cc.), potassium carbonate (5 grams) and acetone (50 cc.) was heated under reflux for 6 hours. The acetone was evaporated and ethanol was added to the residue giving a solid precipitate. This was recrystallised from ethanol to give 4-chloro-2-oxobenzothiazolin-3-ylacetonitrile, M.P. 160.5–161° C.

(Found: C, 48.3; H, 2.3. $C_9H_5ClN_2OS$ requires C, 48.1; H, 2.2%.)

The nitrile (2 grams) prepared above and sulphuric acid (30 cc. of 30% v./v.) were heated to 130–140° C. for ¾ hour. Chilling of the reaction mixture produced a precipitate which was isolated, washed with water and dried. The product had a melting point of 193° C., and was identical to the 4-chloro-2-oxobenzothiazolin-3-yl-acetic acid prepared in Example 3.

*Example 10*

A mixture of 4-chloro-2-oxobenzothiazoline (7 grams), 2-chloroacetamide (3.5 grams), potassium carbonate (10 grams) and acetone (75 cc.) was heated under reflux for 12 hours. The reaction mixture was poured into water and the insoluble solid was collected and recrystallised twice from glacial acetic acid to give 4-chloro-2-oxobenzothiazolin-3-ylacetamide, M.P. 280–282° C. with decomposition). (Found: C, 44.9; H, 3.1; N, 11.6. $C_9H_7ClN_2O_2S$ requires C, 44.5; H, 2.9; N, 11.3%.)

The amide (3 grams) prepared above and sulphuric acid (30 cc of 70% v./v.) were heated for 20 minutes at 130–140° C. The reaction product was chilled to give a precipitate which was isolated, washed with water and dried. This material, M.P. 193° C., was identical to the 4-chloro-2-oxobenzothiazolin-3-ylacetic acid prepared in Example 3.

*Example 11*

4-chloro-2-oxobenzothiazoline (9.3 grams) was dissolved in hot 2.2 N sodium hydroxide solution (22.8 cc.) and the solution was boiled under reflux. Cyanomethyl benzenesulphonate (9.9 grams) was then added dropwise with stirring. After addition was complete, the reaction product was boiled for a further 10 minutes and then cooled. The solid precipitate so obtained was isolated by filtration and recrystallised from ethanol to give 4-chloro-2-oxobenzothiazolin-3-ylacetonitrile, M.P. 160–161° C., identical to that obtained in Example 9.

*Example 12*

Potassium 4 - chloro - 2-oxobenzothiazolin-3-ylacetate (28.2 grams) and ethyl alpha-bromopropionate (18.1 grams) were boiled under reflux in ethyl lactate (100 cc.) for 1 hour. The reaction mixture was cooled, poured into 1 litre of water and the product was extracted with methylene chloride. The extract was dried over anhydrous magnesium sulphate and the solvent removed by distillation. By two distillations in vacuo of the residue there was obtained ethyl alpha-(4-chloro-2-oxobenzothiazolin-3-ylacetoxy)propionate, B.P. 187–190° C./0.5 mm. Found: C, 49.1; H, 4.2; N, 4.5. $C_{14}H_{14}ClNO_5S$ requires C, 49.0; H, 4.1; N, 4.1%.)

*Example 13*

Ethyl 2-oxobenzothiazolin-3-ylacetate (11.9 grams) was dissolved in benzene (100 cc.) and a solution of sulphuryl chloride (6.8 grams) in benzene (50 cc.) was added dropwise with stirring during 15 minutes. The temperature of the reaction mixture was then slowly raised until it boiled, whereupon the solvent was removed by evaporation. The oily residue crystallised on cooling, M.P. 78–83° C.

The solid (13.6 grams) so obtained, consisting of a mixture of ethyl chloro-2-oxobenzothazolin-3-ylacetates was dissolved in methanol (50 cc.) and the solution was heated to boiling. N sodium hydroxide (50 cc.) was then added dropwise with stirring at such a rate that no turbidity developed in the solution. The methanol was allowed to distil slowly during the addition and finally all the methanol was removed on the steambath and the residual solution cooled to 0° C. by adding ice. The mixture was acidified by the addition of dilute hydrochloric acid and the solid so obtained isolated by filtration. It had a melting point of 150–160° C. By infra-red analysis, the solid was estimated to contain approximately 60% of 2-oxobenzothiazolin-3-ylacetic acid, 20% of 6-chloro-2-oxobenzothiazolin-3-ylacetic acid and 7% 4-chloro-2-oxobenzothiazolin-3-ylacetic acid.

*Example 14*

In the preparation of a herbicidal dust, 2.5 parts by weight of 4-chloro-2-oxobenzothiazolin-3-ylacetic acid was intimately mixed with 97.5 parts by weight of kaolin.

Similar compositions were prepared using the compounds of the invention described in Examples 1, 4, 5, 6, 7, 9, 10 and 12 in place of 4-chloro-2-oxobenzothiazolin-3-ylacetic acid.

*Example 15*

In the preparation of a dispersible powder 20 parts by weight of 4-chloro-2-oxobenzothiazolin-3-ylacetic acid was intimately mixed with 8 parts by weight of Belloid T. D. (a proprietary dispersing agent which is a condensate of formaldehyde and an alkyl aryl sulphonate) and 72 parts by weight of kaolin. This composition may be added to water to form a dispersion suitable for use as a herbicide.

Similar compositions were prepared using the compounds of the invention described in Examples 1, 4, 5, 6, 7, 9, 10 and 12 in place of 4-chloro-2-oxobenzothiazolin-3-ylacetic acid.

*Example 16*

In the preparation of a herbicidal composition 4 grams of 4-chloro-2-oxobenzothiazolin-3-ylacetic acid was dissolved with warming in a solution of 1.75 grams of diethanolamine in 50 cc. of water. The solution was diluted to 1000 cc. by the addition of water. There was thus obtained an aqueous solution containing 0.4% w./v. of 4-chloro-2-oxobenzothiazolin-3-ylacetic acid in the form of its diethanolamine salt.

*Example 17*

In the preparation of a herbicidal composition 4 grams of 4-chloro-2-oxobenzothiazolin-3-ylacetic acid was dissolved with warming in a solution containing 1.75 grams of diethanolamine and 0.2 gram of Manoxol N (a proprietary wetting agent which is sodium dinonyl sulphosuccinate) in 50 cc. of water. The solution was diluted to 1000 cc. by the addition of water to obtain an aqueous solution containing 0.4% w./v. of 4-chloro-2-oxobenzothiazolin-3-ylacetic acid in the form of its diethanolamine salt.

*Example 18*

In the preparation of a herbicidal composition 4 grams of 4-chloro-2-oxobenzothiazolin-3-ylacetic acid was dissolved with warming in 50 cc. of an aqueous solution containing 0.66 gram of sodium hydroxide. The solution was diluted to 1000 cc. by the addition of water to obtain an aqueous solution containing 0.4% w./v. of 4-chloro-2-oxobenzothiazolin-3-ylacetic acid in the form of its sodium salt.

*Example 19*

In the preparation of a herbicidal composition 4 grams of 4-chloro-2-oxobenzothiazolin-3-ylacetic acid was dissolved with warming in 50 cc. of an aqueous solution containing 0.66 gram of sodium hydroxide and 0.2 gram of Manoxol N. The solution was diluted to 1000 cc. by the addition of water.

Similar compositions to those described in Examples 16–19 were prepared using 4-bromo-2-oxobenzothiazolin-3-ylacetic acid in place of 4-chloro-2-oxobenzothiazolin-3-ylacetic acid.

*Example 20*

In the preparation of a dispersible solution 8 grams of 4-chloro-2-oxobenzothiazolin - 3 - ylacetic acid was dissolved in 100 cc. of acetone containing 2 grams of Belloid T. D.

Similar compositions were prepared using the ethyl and methyl esters of 4-chloro-2-oxobenzothiazolin-3-ylacetic acid and 4-bromo-2-oxobenzothiazolin-3-ylacetic acid and its ethyl ester in place of 4-chloro-2-oxobenzothiazolin-3-ylacetic acid.

*Example 21*

In the preparation of an aqueous emulsion 4.5 grams of ethyl 4-chloro-2-oxobenzothiazolin-3-ylacetate was mixed with 50 cc. of xylene containing 1 cc. of Ethylan S.E. (a proprietary emulsifying agent which is a mixture of lauric diethanolamide and a polyethylene oxide condensate of an octylphenol). The mixture was diluted to 1000 cc. by the addition of water.

*Example 22*

In the preparation of concentrated aqueous solutions suitable for dilution with water to obtain herbicidal compositions for application to plants, the following ingredients were used.

(a) Sodium 4-chloro-2-oxobenzothiazolin-
   3-ylacetate_____ 20 grams a.e.
   Water to 100 cc.
(b) Diethanolamine 4-chloro-2-oxobenzo-
   thiazolin-3-ylacetate_____ 20 grams a.e.
   Water to 100 cc.

[a.e. represents acid equivalent.]

*Example 23*

In field trials designed to evaluate further 4-chloro-2-oxobenzothiazolin-3-ylacetic acid and its ethyl ester, conventional small plot trials were carried out. Trials 1, 2 and 3 summarise these; the "% control" is based on fresh weight of the aerial portions of the weeds in the three replicates compared with untreated controls.

TRIAL 1.—INFESTING WEED—CLEAVERS
(*Galium aparine*)

| Treatment | Rate, lbs. a.e./acre | Stage of growth of weeds | Percent control |
|---|---|---|---|
| Ethylester | ¼ ½ 1 | Cleavers about 6" high, vigorous. | 100 100 100 |
| Acid | ¼ ½ 1 | Cleavers more than 1" high and flowering. | 67 70 85 |

TRIAL 2.—INFESTING WEED—REDSHANK
(*Polygonium persicaria*)

| Treatment | Rate | Stage | Percent control |
|---|---|---|---|
| Ethylester | ¼ ½ 1 | Seedling | 35 50 55 |

TRIAL 3.—INFESTING WEED—CHICKWEED
(*Stellaria media*)

In this trial it was not possible to make a quantitative assessment but substantially 100% elimination of the weed was achieved by application of the ethyl ester at ¼, ½ and 1 lb. a.e./acre, as judged by visual inspection of the plots.

*Example 24*

A composition suitable for application to plants after dilution with water was prepared with the following ingredients:

Diethanolamine salt of 4-chloro-2-oxo-
   benzothiazolin-3-ylacetic acid_____ 10 grams a.e.
Diethanolamine salt of M.C.P.A._____ 20 grams a.e.
Water to 100 cc.

*Example 25*

To aqueous solutions of the diethanolamine salt of M.C.P.A., various quantities of ethyl 4-chloro-2-oxobenzothiazolin-3-ylacetate and Ethylan S.E. (a proprietary emulsifying agent) in a mixture of equal volume of acetone and toluene were added to give an emulsion containing 10% w./v. of the ester, the weight of Ethylan S.E. being half that of the ester in each case. Mixtures containing the ester and the salt in the ratios of 1:4, 1:2 and 1:1 (acid equivalent) were prepared. Conventional small plot trials were carried out with these compositions, which were diluted with water before use and were applied at rates equivalent to 40 gallons/acre. The trial details were as follows, the weed control being designated using the same response levels of 0–6 as were used in the tests described in the body of the specification. Weed control using ethyl 4-chloro-2-oxobenzothiazolin-3-ylacetate alone is also shown.

TRIAL 4.—INFESTING WEED—MAYWEED
(*Matricaria inodora*)

| Ethyl 4-chloro-2-oxobenzothiazolin-3-ylacetate, lbs. a.e./acre | M.C.P.A., lbs. a.e./acre | Weed control (visual assessment) |
|---|---|---|
| ¼ | 0 | 0 |
| ½ | 0 | 1 |
| 1 | 0 | 2 |
| ¼ | 1 | 5 |
| ½ | 1 | 6 |
| 1 | 1 | 6 |

*Example 26*

A composition suitable for application to plants after dilution with water was prepared with the following ingredients:

Diethanolamine salt of 4-chloro-2-oxo-ben-
   zothiazolin-3-ylacetic acid_____ 5 grams a.e.
Diethanolamine salt of C.M.P.P._____ 20 grams a.e.
Water to 100 cc.

We claim:

1. A compound selected from the group consisting of the 4-chloro-2-oxobenzothiazolin-3-ylacetic acid, the salts of said acids with herbicidally acceptable cations and the esters of said acids with herbicidally acceptable alcohols selected from the group consisting of alkanols of 1–9 carbon atoms, omega phenyl lower alkanols, lower alkoxy alkanols and ethyl lactate.
2. 4-chloro-2-oxobenzothiazolin-3-ylacetic acid.
3. Ethyl 4-chloro-2-oxobenzothiazolin-3-ylacetate.
4. Methyl 4-chloro-2-oxobenzothiazolin-3-ylacetate.
5. 2-2′-butoxyethoxyethyl 4-chloro-2-oxobenzothiazolin-3-ylacetate.
6. A salt of 4-chloro-2-oxobenzothiazolin-3-ylacetic acid with a lower alkylamine.
7. A salt of 4-chloro-2-oxobenzothiazolin-3-ylacetic acid with a hydroxy lower alkylamine.
8. An alkali metal salt of 4-chloro-2-oxobenzothiazolin-3-ylacetic acid.

References Cited in the file of this patent

UNITED STATES PATENTS

| 2,468,075 | Jayne et al. | Apr. 26, 1949 |
| 2,550,321 | Ackermann | Apr. 24, 1951 |
| 2,653,865 | Kosmin et al. | Sept. 29, 1953 |
| 2,922,794 | Model et al. | Jan. 26, 1960 |

OTHER REFERENCES

Allen et al.: Chem. Abstracts, vol. 43, column 5022 (1949).